Aug. 27, 1935.  J. DUFFY  2,012,811
ROASTING APPARATUS
Filed May 14, 1932
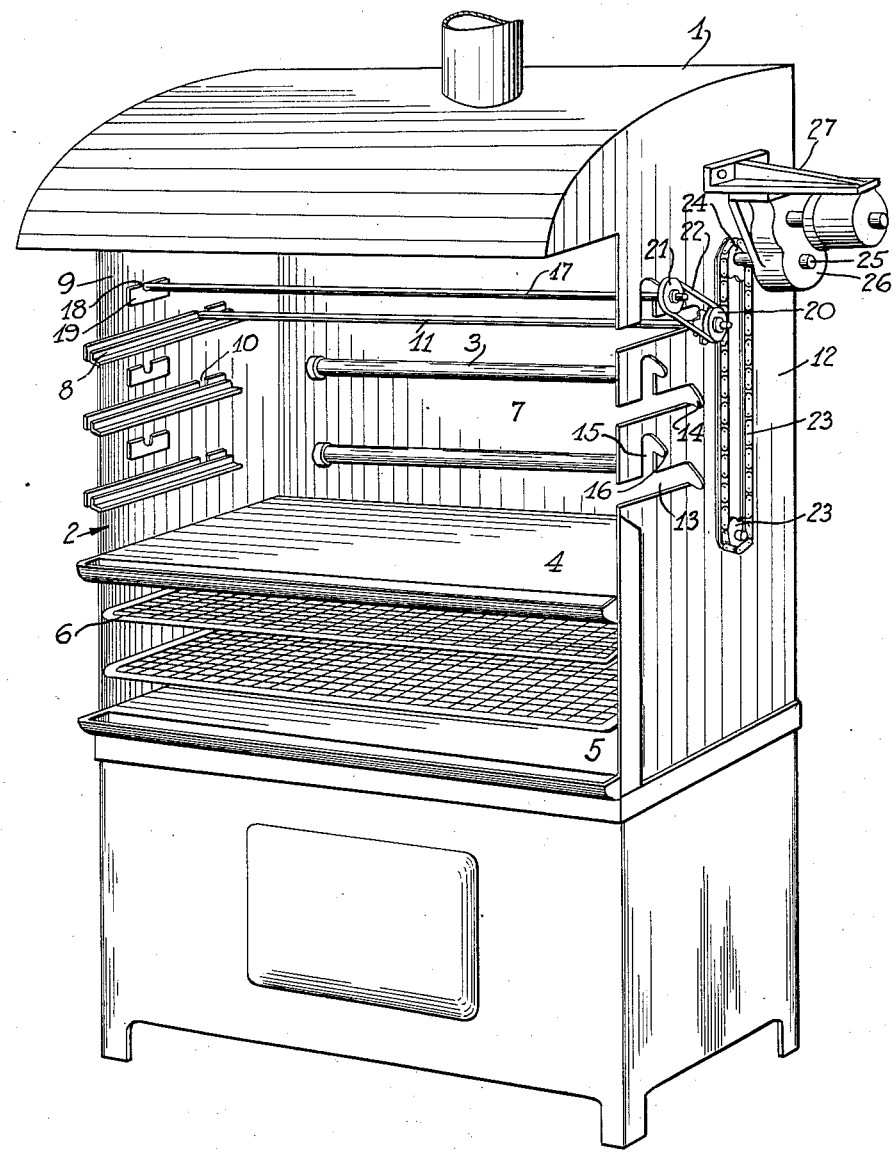
INVENTOR.
JOHN DUFFY.
BY
ATTORNEY.

Patented Aug. 27, 1935

2,012,811

UNITED STATES PATENT OFFICE 2,012,811

ROASTING APPARATUS

John Duffy, West New York, N. J.

Application May 14, 1932, Serial No. 611,351

1 Claim. (Cl. 126—41)

This invention relates to a new and improved meat roasting apparatus, and the invention contemplates certain improvements over those disclosed in my co-pending application, Serial #589,641, filed January 29, 1932.

One of the objects of the invention is to provide a meat roasting apparatus of the above character wherein meat carrying spits may be supported and operated at varying distances from the source of heat.

Another object of the invention is to provide a construction wherein a meat carrying spit is so supported in oven of the class described, that while the meat thereon is exposed to the view of prospective customers it is nevertheless subjected to sufficient heat to keep it heated, if already roasted, or to preheat it before it is subjected to the roasting heat of the oven.

Another object of the invention is to provide with a plurality of meat carrying spits with a plurality of independent spit supporting means, located forwardly of the first named spits, and in such positions that the meat thereon will be subected to direct heat from the roasting means which would ordinarily be wasted.

Other objects of the invention will be in part obvious and in part pointed out hereinafter.

The invention accordingly consists in the features of construction, combinations of elements and arrangement of parts which will be exemplified in the construction hereinafter set forth, and the scope of the application of which will be indicated in the following claim.

In the accompanying drawing wherein I have illustrated the preferred form of embodiment of my invention, The figure is a prospective view illustrating this preferred embodiment of my invention.

Referring now to the drawing, the reference #1 Figure 1, denotes the casing of the apparatus, provided with the roasting chamber 2, having the heat devices 3. The bottom wall of the roasting chamber is formed by the horizontally disposed partition 4, and beneath this partition is a chamber 5, adapted to receive trays 6.

The heating means provided consist of Bunsen burners, the latter consisting of horizontally disposed, apperatured pipes which extend along the rear wall 7 of the casing.

The reference #8 denotes ledges or shelves comprising strips of material fastened to the side wall 9 of the casing, said strips, at their inner ends, being provided with notches 10, adapted to receive the ends of the meat carrying spits 11. The wall 12 of the casing is provided with a plurality of inwardly extending slots 13. The inner end of each slot terminated in the inwardly and downwardly extending notches 14, which are adapted to receive the shafts of the meat spits. If desired, these slots may be closed by the means of disclosed in the aforementioned co-pending application so that heat may be conserved. Extending upwardly from each of the slots 13 and formed in the wall of the casing 12 is a slot 15, and each of the slots 15 is provided with an inwardly and a downwardly extending notch 16. These notches 16 are adapted to support the shafts of spits 17, the opposite end of said spits resting in notches 18, formed in strips 19, fastened to the wall 9 of the casing. The notches 18 are of course directly opposite the notches 16 of the slots 15.

Provided upon the shafts of the spits 11 are pulley wheels 20, similar pulley wheels 21 being provided upon the shafts of the spits 17, the pulley wheels 21 are driven by the pulley wheels 20 as by means of belts 22.

By means of the construction shown and above described, it will be noted that spits upon which the meat to be subjected upon the ordinary roasting operation are carried in the notches 14 and 10, and that the notches 16 and 18 are adapted to support other meat carrying spits in positions located forwardly and above the first named spits. This permits of the supporting of meat carrying spits in positions where the meat thereon is better exposed to the view of prospective customers, and at the same time provides for the meat thereon, receiving a sufficient amount of heat to keep the meat thereon in a heated condition, or to provide for the pre-heating of the meat, or for partly roasting the same before the spit upon which it is carried is moved in the position in the notches 14 and 10.

The shafts of the spits 11 are of course provided with the usual sprockets which are driven by the sprocket chain 23, the latter being carried by sprockets 23 and 24. Sprocket 24 is driven as by means of a motor 25, located in a casing 26, supported upon a bracket 27, fastened to the wall 12 of the casing. It will be observed that when it is desired to remove one of meat carrying spits, the shafts of which occupy the notches 14 and 10, it is merely necessary to move the said shaft forwardly along one of the slots 13 and one of the ledges 8 a sufficient distance so that the spit occupying the notches 16 and 18 may be moved downwardly through the slot 15 and then rearwardly and into the notches 14 and 10. The meat carrying spit upon which the roasting has been effected may then be moved so that its shaft will occupy the notches 16 and 18.

Thus it will be seen that the meat carrying spits may be manipulated in the manner shown, without entirely removing them from the roasting chamber.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claim is intended to cover all of the generic and specific features of the invention herein described, and all statements of the scope of the invention which, as a matter of language, might be said to fall therebetween.

Having thus described my invention, what I claim as new and desire to secure by Letters Patent is:—

An apparatus of the class described, comprising a casing having top, bottom, side and rear walls, the front side of said casing being open, one of said side walls being provided with a plurality of inwardly extending slots, each slot being provided with a rearwardly and downwardly extending portion which forms a bearing for a spit, each of said slots being provided with an upwardly extending branch and each branch having a rearwardly and downwardly extending spit bearing portion, and the opposite side wall of said casing being provided with a plurality of spit bearing portions located in positions to receive the inner ends of spits carried in said first mentioned spit bearing portions, a plurality of spits located in said spit bearing portions and means for driving said spits in whatever positions they occupy of said spit bearing portions.

JOHN DUFFY.